Patented Jan. 2, 1923.

1,440,848

UNITED STATES PATENT OFFICE.

UMETARO SUZUKI, OF TOKYO, JAPAN.

PROCESS OF MAKING SODIUM COMPOUNDS OF DIOXYDIAMINOARSENOBENZENE.

No Drawing. Original application filed June 7, 1916, Serial No. 102,317. Divided and this application filed February 26, 1918. Serial No. 219,251.

*To all whom it may concern:*

Be it known that I, UMETARO SUZUKI, a subject of the Emperor of Japan, residing at Tokyo, Japan, have made a certain new and useful Invention in Processes of Making Sodium Compounds of Dioxydiaminoarsenobenzene, of which the following is a specification.

This invention relates to sodium compounds from dioxydiaminoarsenobensol hydrochlorid, and particularly to subject matter divided from my co-pending application Serial No. 102,317, filed June 7, 1916, and patented February 10, 1920, as No. 1,330,288.

The object of the invention is to improve the commercial form of salts, bases, or compounds of aminooxyarsenobenzene, or other derivatives of oxyarylarsinic acids in order to remove the danger and disadvantages attending the use of the same.

The dihydrochloride derivative of dioxydiaminoarsenobenzene, $$(AsC_6H_3(OH)NH_2)_2 2HCl,$$

is acid in reaction and cannot be used in its original form. It has been a common practice to treat the dihydrochloride with an alkali. This necessitates great caution since an excessive as well as an insufficient quantity of alkali employed causes pain to patients using the same besides renders the compound harmful. Moreover, the commercial form of the dihydrochloride compound referred to, or its derivatives, when treated with an alkali for practical use, is subject to rapid oxidation which converts it into a strong poison. This defect requires that the compound be treated with an alkali only at the time of use of the compound and immediately before such use in order to avoid the serious poisoning effects due to the partial oxidation of the dihydrochloride compound.

It is among the special objects of the present invention to avoid these and other objections, and to provide a product from the dihydrochloride, or a compound from the same, and a method of preparing it, in which the dangers noted are avoided, and wherein the compound can be preserved in a form ready for use, and which possesses the healing or therapeutic value of the original product.

In carrying out my invention I produce a sodium compound in the form of an amorphous yellowish brown powder, soluble in water, or in physiological salt solution, with a resulting light yellow color, and having a slightly alkaline reaction and having the formula

The compound is soluble in methyl alcohol, but is nearly insoluble in ether, petroleum ether, ethyl alcohol, or acetone. Not being an acid the compound does not require neutralization, but can be used directly, and dissolved in water or physiological salt solution, as an injection, and can be preserved indefinitely in dry powdered form without danger of oxidation and consequent formation of noxious or poisonous substances.

In carrying out my invention the dioxydiaminoarsenobenzene, or derivative thereof, or the dihydrochloride, as expressed in the first chemical formula above given, say, for example, five grams is moistened with alcohol, say 5 cc., and dissolved in methyl alcohol, for example, 40 to 50 cc. To the resulting clear yellow methyl alcohol solution of the dihydrochloride is added sodium methylate solution (which may be prepared for example, by dissolving 4 grams of metallic sodium in 100 cc. of absolute methyl alcohol) to the extent, in the example stated, of 24 to 25 cc. A thick brownish yellow precipitate is produced which partly dissolves again by the addition of a further quantity of sodium methylate. In order to ascertain whether or not a sufficient quantity of the sodium methylate has been used a few drops of the solution are added to three to five cc. of water. If the solution does not dissolve quite clear a little more of the sodium methylate is added to the methyl alcohol solution of the dihydrochloride. Excess of the sodium methylate must be avoided. The solution is then precipitated with ether, for example, 500 cc., to which is added ethyl alcohol, say 30 to 50 cc. The resulting yellowish brown precipitate is collected and removed by filtration, or otherwise, is washed with ether and suitably dried. The yield of the sodium compound thus obtained, employing the quantities of materials given in the above example, is from five to six grams.

Having now set forth the object and nature of my invention, what I claim as new and useful, and of my own invention, and desire to secure by Letters Patent, is:—

The herein described process of manufacturing sodium compounds from the dihydrochloride of dioxydiaminoarsenobenzene which comprises in dissolving said dihydrochloride product in methyl alcohol and then precipitating the solution with sodium methylate.

In testimony whereof I have hereunto set my hand on this twenty-sixth day of January A. D. 1918.

UMETARO SUZUKI.